(12) United States Patent
Lovett et al.

(10) Patent No.: US 7,549,280 B2
(45) Date of Patent: Jun. 23, 2009

(54) SECTIONALIZED BELT GUIDE FOR DRAPER BELT IN AN AGRICULTURAL HARVESTING MACHINE

(75) Inventors: Benjamin M. Lovett, Colona, IL (US); Mark A. Melton, Erie, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/109,672

(22) Filed: Apr. 25, 2008

(65) Prior Publication Data

US 2008/0202090 A1 Aug. 28, 2008

Related U.S. Application Data

(63) Continuation-in-part of application No. 11/366,033, filed on Mar. 2, 2006, now Pat. No. 7,412,816.

(51) Int. Cl.
*A01D 67/00* (2006.01)
(52) U.S. Cl. .................................................. 56/208
(58) Field of Classification Search ............. 56/181, 56/14.5, 158, 208; 198/699, 841, 523
See application file for complete search history.

(56) References Cited

U.S. PATENT DOCUMENTS

| | | | | |
|---|---|---|---|---|
| 1,862,101 A | * | 6/1932 | Pax | 198/523 |
| 2,347,365 A | * | 4/1944 | Paradise | 198/699 |
| 2,720,743 A | * | 10/1955 | Prather | 56/207 |
| 2,795,922 A | * | 6/1957 | Hume | 56/257 |
| 3,982,383 A | * | 9/1976 | Mott | 56/11.6 |
| 4,441,307 A | * | 4/1984 | Enzmann | 56/208 |
| 4,573,308 A | * | 3/1986 | Ehrecke et al. | 56/14.4 |
| 4,665,685 A | * | 5/1987 | Rupprecht | 56/208 |
| 4,776,153 A | * | 10/1988 | DePauw et al. | 56/10.2 E |
| 4,875,331 A | * | 10/1989 | Ostrup et al. | 56/208 |
| 5,459,986 A | * | 10/1995 | Talbot et al. | 56/181 |
| 5,711,140 A | * | 1/1998 | Burmann | 56/208 |
| 6,351,931 B1 | * | 3/2002 | Shearer | 56/181 |
| 2007/0193243 A1 | | 8/2007 | Schmidt et al. | |
| 2008/0092508 A1 | * | 4/2008 | Talbot et al. | 56/181 |

* cited by examiner

*Primary Examiner*—Árpád Fábián-Kovács
(74) *Attorney, Agent, or Firm*—Taylor & Aust, P.C.

(57) ABSTRACT

A cutting platform for use with an agricultural harvesting machine includes a plurality of platform sections. One or more of the platform sections include a cutterbar assembly which is movable in a localized manner in upwards and downwards directions. An endless belt has a leading edge. A plurality of belt guides each have a rear edge with an upper surface and a lower surface. Each lower surface partially overlies the leading edge of the endless belt. Adjacent belt guides have an overlap with a smooth upper transition and/or smooth lower transition at the overlap. A smooth upper transition has an absence of any discontinuities extending above adjacent upper surfaces, and a smooth lower transition has an absence of any discontinuities extending below adjacent lower surfaces.

25 Claims, 12 Drawing Sheets

SECTIONALIZED BELT GUIDE FOR DRAPER BELT IN AN AGRICULTURAL HARVESTING MACHINE

CROSS REFERENCE TO RELATED APPLICATIONS

This is a continuation-in-part of U.S. patent application Ser. No. 11/366,033, entitled "SECTIONALIZED BELT GUIDE FOR DRAPER BELT IN AN AGRICULTURAL HARVESTING MACHINE", filed Mar. 2, 2006, now U.S. Pat. No. 7,412,816 which is incorporated herein by reference.

FIELD OF THE INVENTION

The present invention relates to agricultural harvesting machines, and, more particularly, to agricultural combines including a draper cutting platform.

BACKGROUND OF THE INVENTION

An agricultural harvesting machine such as a combine includes a head and a feeder housing which remove the crop material from the field, gather the crop material and transport the crop material to a separator. In the case of thinner stemmed crops such as soybeans, wheat, etc. which may be cut with a sickle bar carrying a plurality of knives, the head may also be known as a cutting platform. The separator removes the grain crop material from the non-grain crop material. The grain is cleaned and deposited in a grain tank. When the grain tank becomes full, an unloading auger which is positioned alongside the combine during harvesting is moved to the unloading position in which the auger extends approximately perpendicular to the longitudinal axis of the combine. The combine drives alongside a vehicle into which the grain is to be unloaded, such as a semi-trailer, and the unloading auger is actuated to discharge the grain into the vehicle.

A cutting platform may generally be of two types. One type typically has a sheet metal floor with a dual feed auger near the rear of the cutting platform for feeding the crop material longitudinally to the feeder housing. A cutting platform of this type with auger feed is more common.

Another type of cutting platform, also known as a draper platform, utilizes a flat, wide belt, referred to as a draper or draper belt to convey crop material. The arrangement and number of belts vary among platforms. One style of draper platform has two side belts that convey crop material longitudinally to the center of the platform, where a center feed belt moves the crop material laterally into the feeder housing. Each belt is wrapped around a pair of rollers, one being a drive roller and the other being an idler roller.

An example of this type draper arrangement is disclosed in U.S. Pat. No. 6,202,397, which is assigned to the assignee of the present invention.

An advantage of a draper platform is that larger amounts of crop material can be transported without plugging, etc. For example, with wide platforms approaching 40 feet or even larger, the amount of crop material transported to the feeder housing can be substantial. With an auger feed platform, the crop material may bind between the auger and the back wall of the platform. In contrast, with a draper platform, the crop material is carried on top of the belt with less chance for plugging.

Draper platforms currently in use have a rigid framework not allowing the framework to flex to any appreciable extent during use. The draper platform can be placed in a "float" position such that the cutterbar at the leading edge does not dig into the ground, but the leading edge of the platform itself cannot flex across the width of the platform as a result of uneven ground terrain. This results in some crop material being missed in ground depressions, etc., while also possibly causing a part of the cutterbar to dig into localized ground elevations (e.g., small mounds, etc.). Of course, missed crop material directly translates into missed revenue, and localized gouging of soil can cause additional repair expenses resulting from broken knives, knife guards, etc.

What is needed in the art is a draper platform which better follows the ground contour during operation.

SUMMARY OF THE INVENTION

The invention comprises, in one form thereof, a cutting platform for use with an agricultural harvesting machine, including a plurality of platform sections. One or more of the platform sections include a cutterbar assembly which is movable in a localized manner in upwards and downwards directions. An endless belt has a leading edge. A plurality of belt guides each have a rear edge with an upper surface and a lower surface. Each lower surface partially overlies the leading edge of the endless belt. Adjacent belt guides have an overlap with a smooth upper transition and/or smooth lower transition at the overlap. A smooth upper transition has an absence of any discontinuities extending above adjacent upper surfaces, and a smooth lower transition has an absence of any discontinuities extending below adjacent lower surfaces.

The invention comprises, in another form thereof, a belt guide for use with a cutting platform in an agricultural harvesting machine. The belt guide includes a rear edge and a longitudinal end. The rear edge has an upper surface and a lower surface, with the lower surface configured to partially overlie a leading edge of an endless belt. The longitudinal end has an overlap configured for a smooth upper transition and/or a smooth lower transition with an adjacent belt guide when installed on the cutting platform. A smooth upper transition has an absence of any discontinuities extending above the upper surface, and a smooth lower transition has an absence of any discontinuities extending below the lower surface.

DETAILED DESCRIPTION OF THE INVENTION

Figure 1:
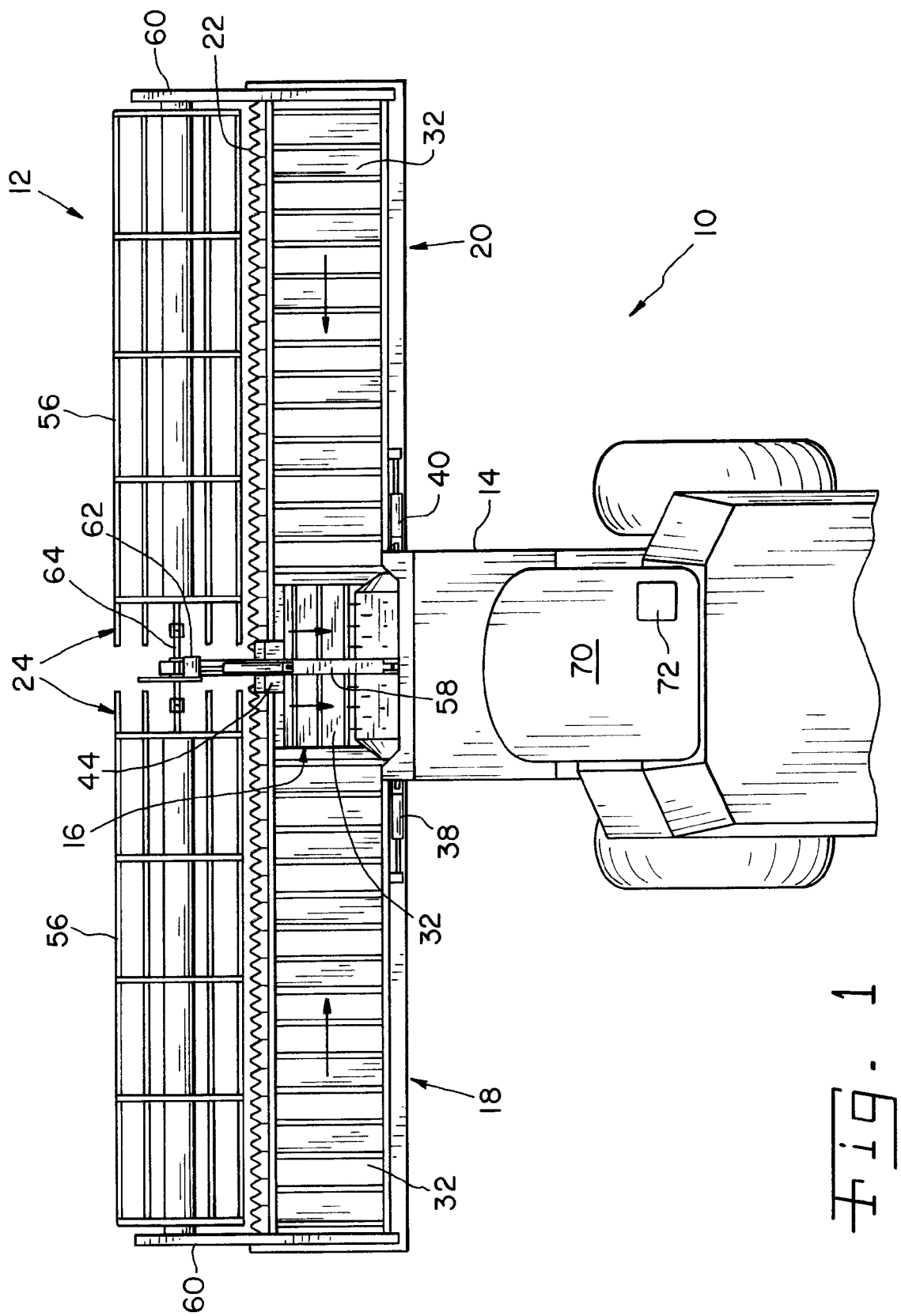
FIG. 1 is a fragmentary, top view of an agricultural combine including an embodiment of a draper platform of the present invention.
Figure 2:
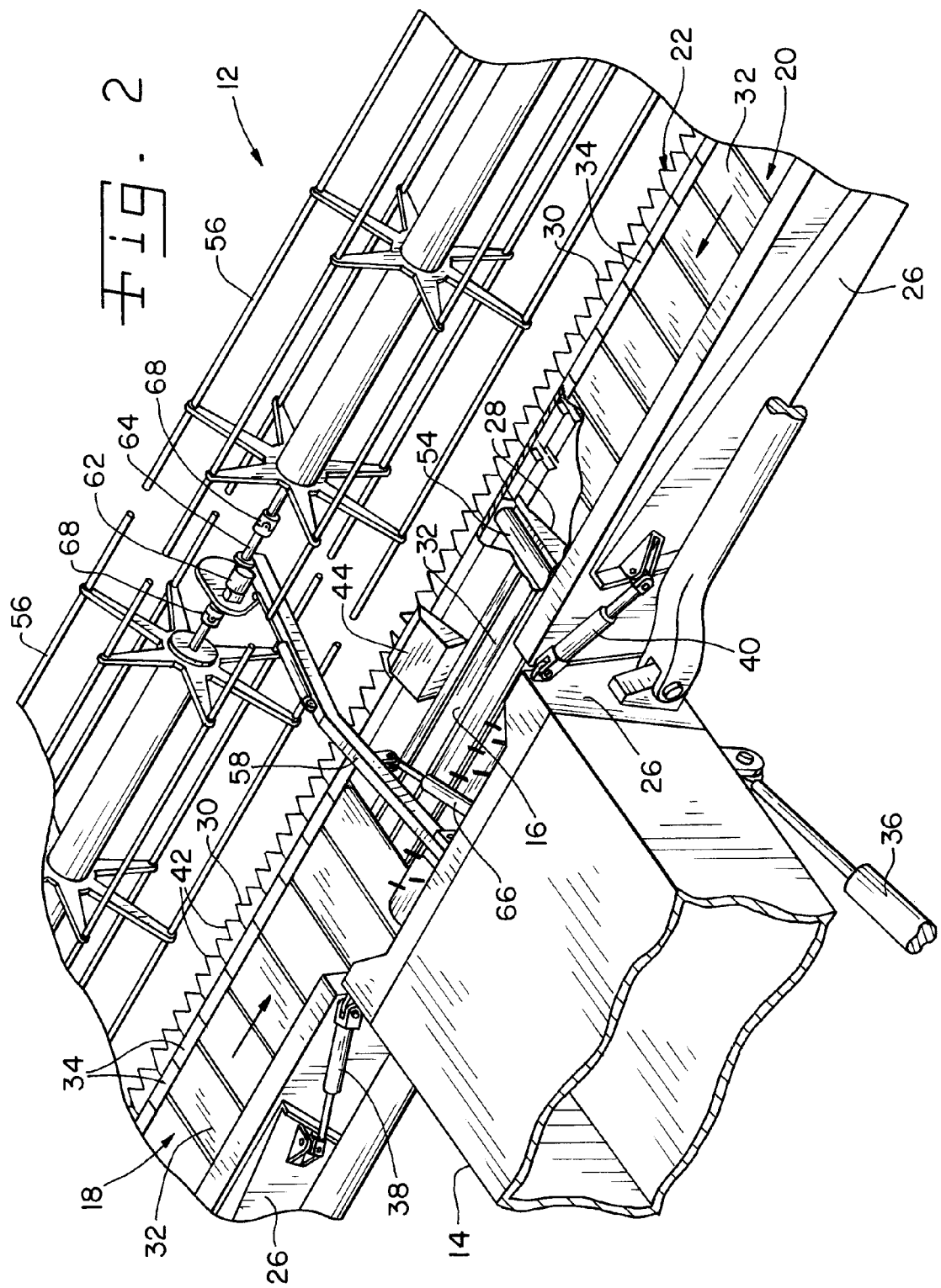
FIG. 2 is a fragmentary, perspective view of the agricultural combine of FIG. 1.
Figure 3:
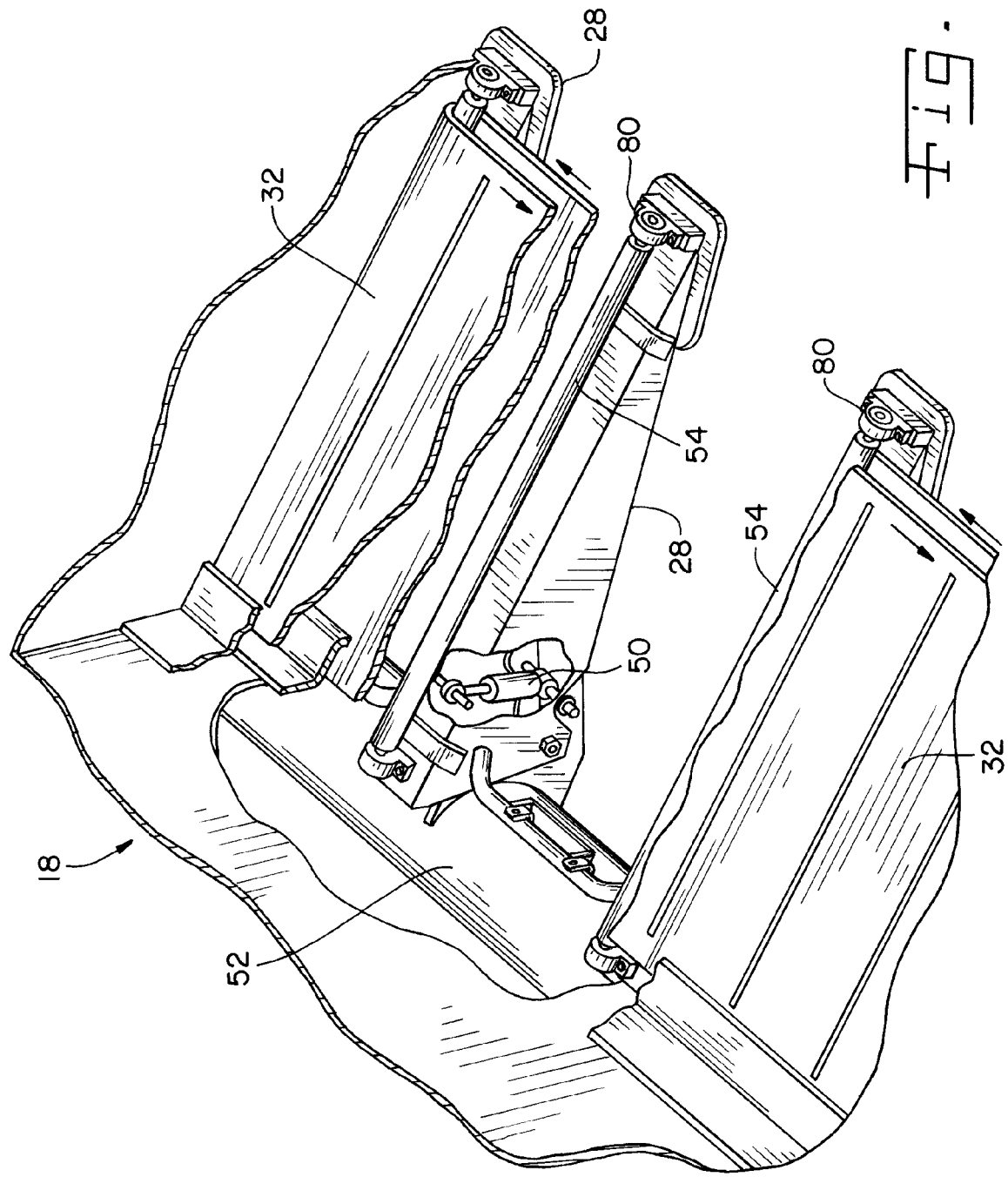
FIG. 3 is a fragmentary, perspective view of the cutting platform shown in FIGS. 1 and 2.

Referring now to the drawings, and, more particularly to FIGS. 1 and 2, there is shown an agricultural harvesting machine in the form of a combine 10 including an embodiment of a cutting platform 12 of the present invention. Combine 10 includes a feeder housing 14 which is detachably coupled with cutting platform 12. Feeder housing 14 receives the crop material from cutting platform 12, both grain and non-grain crop material, and transports the crop material to a separator within combine 10 in known manner (not shown). The grain crop material is separated from the non-grain crop material, cleaned and transported to a grain tank. The non-grain crop material is transported to a chopper, blower, etc. in known manner and distributed back to the field.

Cutting platform 12 generally includes a plurality of platform sections 16, 18 and 20, a cutterbar assembly 22 and a reel assembly 24. In the embodiment shown, platform section 16 is a center platform section, platform section 18 is a first wing platform section, and platform section 20 is a second wing platform section. Although shown with three platform sections, cutting platform 12 may be configured with more or less platform sections, depending upon the particular application.

Each platform section 16, 18 and 20 generally includes a frame 26, a plurality of float arms 28 coupled with a respective frame 26, a cutterbar 30 carried by the outboard ends of respective float arms 28, an endless belt 32, and a plurality of belt guides 34. The frame 26 of first wing platform section 18 and second wing platform section 20 are each pivotally coupled with center platform section 16, such that the outboard ends of first wing platform section 18 and second wing platform section 20 can move up and down independent from center platform section 16. To that end, a lift cylinder 36 coupled between the frame of combine 10 and feeder housing 14 lifts the entire cutting platform 12, a first tilt cylinder 38 coupled between the respective frame 26 of first wing platform section 18 and center platform section 16 pivotally moves first wing platform section 18 relative to center platform section 16, and a second tilt cylinder 40 coupled between the respective frame 26 of second wing platform section 20 and center platform section 16 pivotally moves second wing platform section 20 relative to center platform section 16.

Cutterbar assembly 22 includes two cutterbars 30 carried at the outboard ends of float arms 28 (i.e., at the leading edge of a platform section 16, 18 or 20). Each cutterbar 30 includes a plurality of knives 42 carried by a bar (not specifically shown). The particular type of knife can vary, such as a double blade knife (as shown) or a single blade knife. The bar is formed from a metal which is flexible to an extent allowing a desired degree of flexure across the width of cutting platform 12. In the embodiment shown, a majority of each cutterbar 30 is carried by a respective first wing platform section 18 or second wing platform section 20, with a lesser extent at the adjacent inboard ends of each cutterbar 30 being carried by center platform section 16. Cutterbars 30 are simultaneously driven by a single knife drive 44, providing reciprocating movement in concurrent opposite directions between cutterbars 30.

A plurality of knife guards 46 are positioned in opposition to knives 42 for providing opposing surfaces for cutting the crop material with knives 42. A plurality of keepers 48 spaced along cutterbars 30 have a distal end above cutterbars 30 for maintaining cutterbars 30 in place during reciprocating movement.

Float arms 28 may be pivoted at their connection locations with a respective frame 26. A float cylinder 50 coupled between a respective frame 26 and float arm 28 may be used for raising or lowering the outboard end of float arm(s) 28 at the leading edge of cutting platform 12. Each float cylinder 50 may also be placed in a "float" position allowing the connected float arm 28 to generally follow the ground contour during operation. More particularly, each float cylinder 50 is fluidly connected with an accumulator 52 carried by a platform section 16, 18 or 20. Accumulator 52 allows fluid to flow to and from attached float cylinders 50 such that no pressure build-up occurs. In this manner, the rams associated with each float cylinder 50 are free to move back and forth longitudinally, thereby allowing float arms 28 to follow the ground contour. When not in a float mode, float cylinders 50 can be actuated to move float arms 28 in an upward or downward direction. In the embodiment shown, each float cylinder 50 is a hydraulic cylinder, but could possibly be configured as a gas cylinder for a particular application.

Each float arm 28 is also associated with a respective roller 54. The plurality of rollers 54 for each platform section 16, 18 and 20 carry and are positioned within a loop of a respective endless belt 32. At the inboard end of first wing platform section 18 and second wing platform section 20 is a driven roller, and at the outboard end of first wing platform section 18 and second wing platform section 20 is an idler roller. The rollers positioned between the inboard drive roller and outboard idler roller at each float arm 28 also function as idler rollers. It will be appreciated that the number of float arms 28, and thus the number of rollers 54, may vary depending upon the overall width of cutting head 12 transverse to the travel direction.

Reel assembly 24 includes two reels 56, center reel support arm 58 and a pair of outer reel support arms 60. Outer reel support arms 60 are pivotally coupled at one end thereof with an outboard end of a respective first wing platform section 18 or second wing platform section 20. Outer reel support arms 60 rotationally carry a respective reel 56 at an opposite end thereof. Each outer reel support arm 60 may be selectively moved up and down using a hydraulic cylinder, and the pair of hydraulic cylinders are typically coupled in parallel so that they move together upon actuation.

Center reel support arm 58 is pivotally coupled at one end thereof with center platform section 16 above the opening leading to feeder housing 14. Center reel support arm 58 rotationally carries an inboard end of each reel 56 at an opposite end thereof. A hydraulic motor 62 or other suitable mechanical drive rotationally drives each reel 56. More particularly, hydraulic motor 62 drives a common drive shaft 64 through a chain and sprocket or other suitable arrangement (not shown). The rotational speed of reels 56 can be adjusted by an operator by adjusting the rotational speed of hydraulic motor 62.

Center reel support arm 58 may be selectively moved up and down using a hydraulic cylinder 66. Center reel support arm 58 is movable independently from outer reel support arms 60. To accommodate this independent movement, drive shaft 64 driven by hydraulic motor 62 is coupled at each end thereof via a universal joint 68 with a respective reel 56. This independent movement of center reel support arm 58 can be accomplished manually using a separate actuating switch or lever in operator's cab 70, or automatically using an electronic controller 72 located within cab 70 or other suitable location.

According to an aspect of the present invention, each platform section 16, 18 and 20 has a leading edge which is configured to allow cutterbar assembly 22 to flex an appreciable extent in a localized manner across the width of cutting platform 12.

Figure 4:
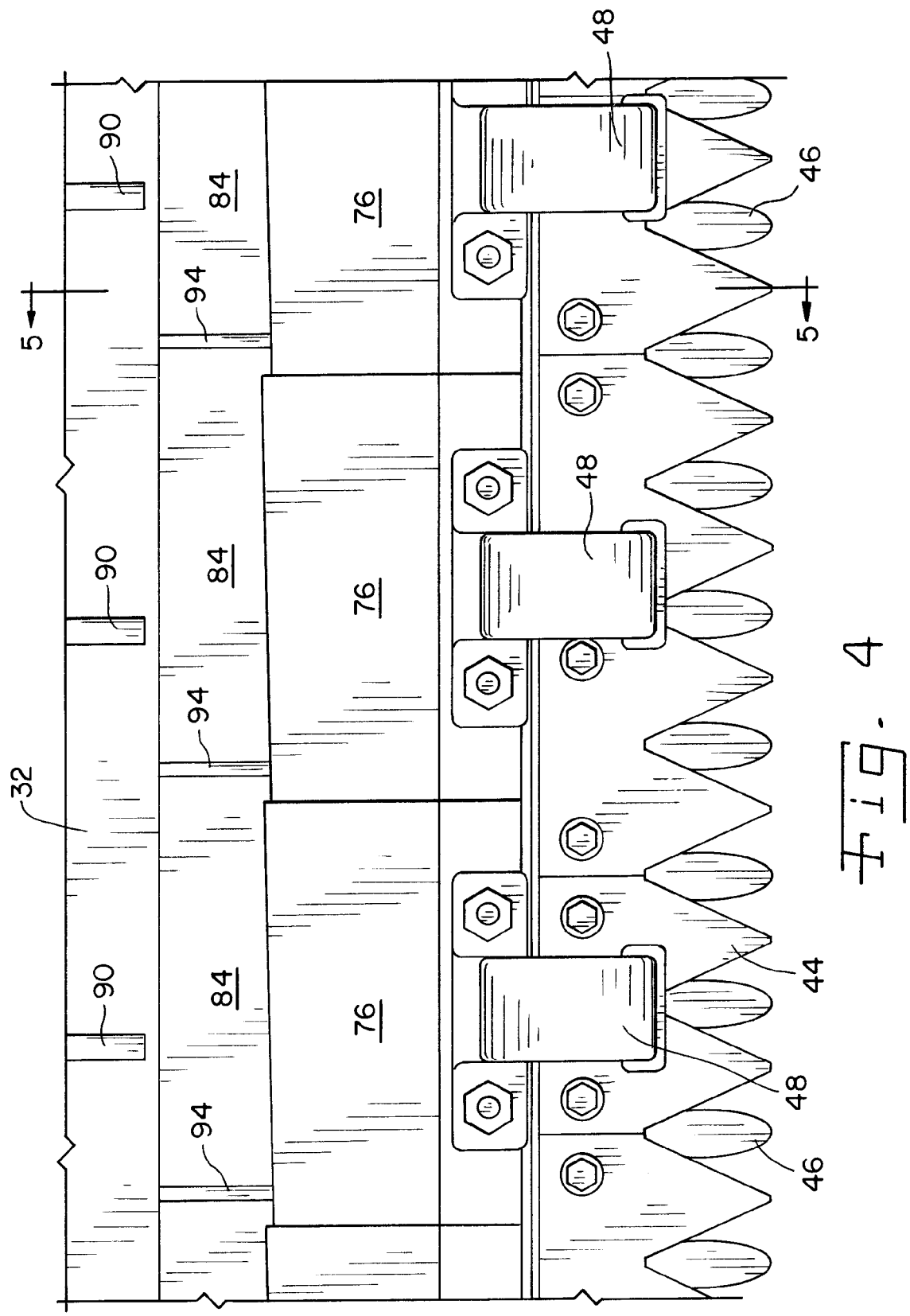
FIG. 4 is a fragmentary, top view of the leading edge of the cutting platform shown in FIGS. 1-3.
Figure 5:
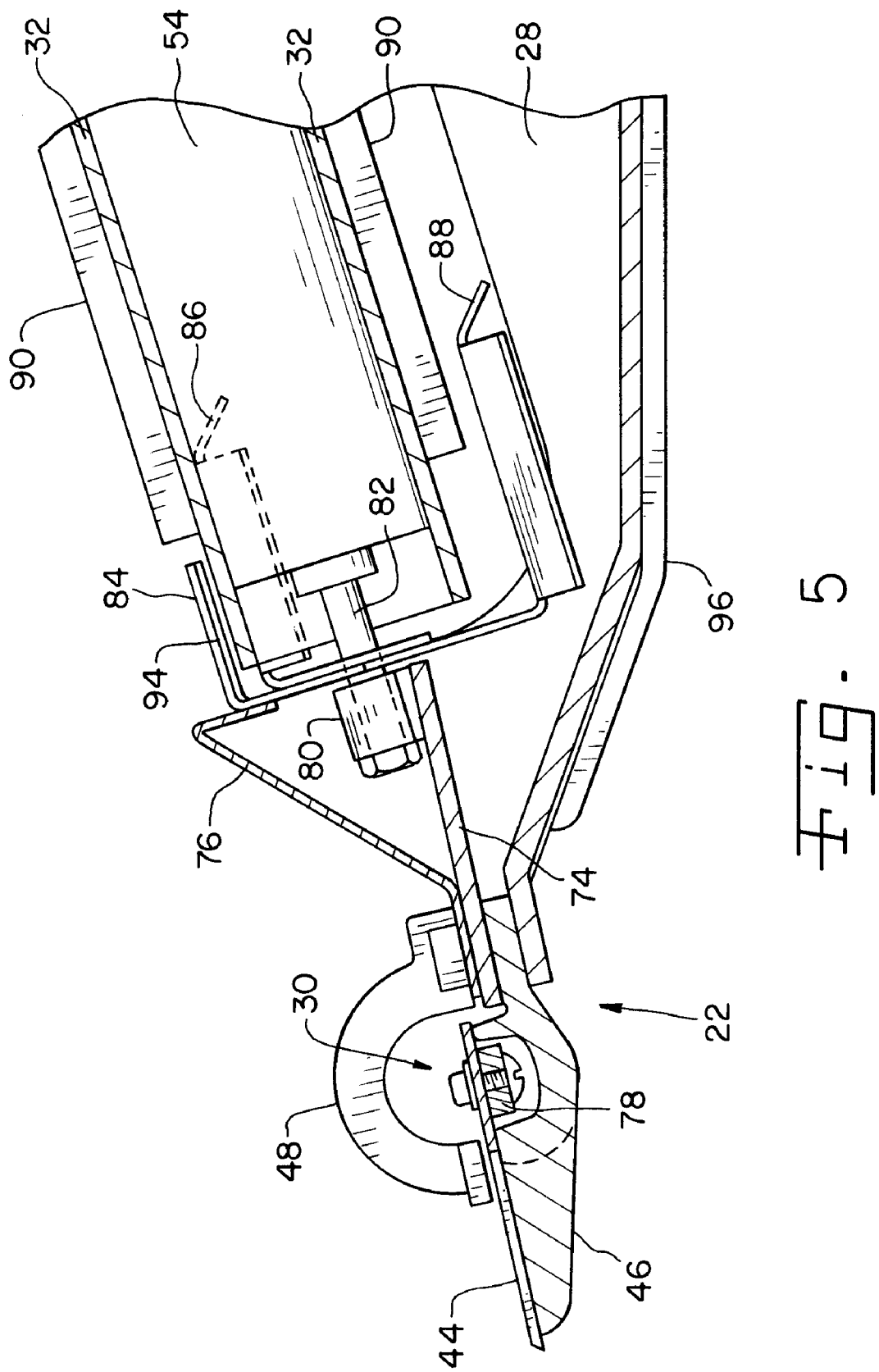
FIG. 5 is fragmentary, sectional view as viewed along line 5-5 in FIG. 4.

Referring to FIGS. 4 and 5, each float arm 28 has a distal end adjacent the leading edge of cutting platform 12. The float arms 28 associated with each respective platform section 16, 18 and 20 are mounted with a corresponding flexible substrate 74 extending substantially across the width of that particular platform section 16, 18 or 20. Flexible substrate 74 for each particular platform section 16, 18 and 20 in essence forms the backbone to which the other modular components (to be described hereinafter) are mounted and allows flexibility of the platform section across the width thereof. In the embodiment shown, flexible substrate 74 is a steel plate with various mounting holes formed therein, and has a modulus of elasticity providing a desired degree of flexibility. The geometric configuration and material type from which flexible substrate 74 is formed may vary, depending upon the application.

The distal end of each float arm 28 is fastened to a knife guard 46, flexible substrate 74, crop ramp 76 and hold down 48. Cutterbar 30, including blades 44 carried by bar 78, is reciprocally carried by knife guards 46. Hold downs 48 which are spaced across the width of cutterbar 30 retain bar 78 within the corresponding grooves formed in knife guards 46.

Crop ramps 76 are overlapped but not rigidly attached to each other, thereby allowing flexure during harvesting operation. Each crop ramp 76 forms an upper ledge positioned above endless belt 32 which assists in maintaining the crop material on endless belt 32 as it is transported toward feeder housing 14. In the embodiment shown in FIG. 5, crop ramp 76 has a flat, angled orientation to assist in transport of the crop material from cutterbar assembly 22 to endless belt 32. For certain applications, it may be possible to eliminate crop ramps 76.

A bushing housing 80 also mounted to flexible substrate 74 carries a bushing (not shown) which in turn carries a mount 82 for rotatably supporting roller 54.

Figure 6:
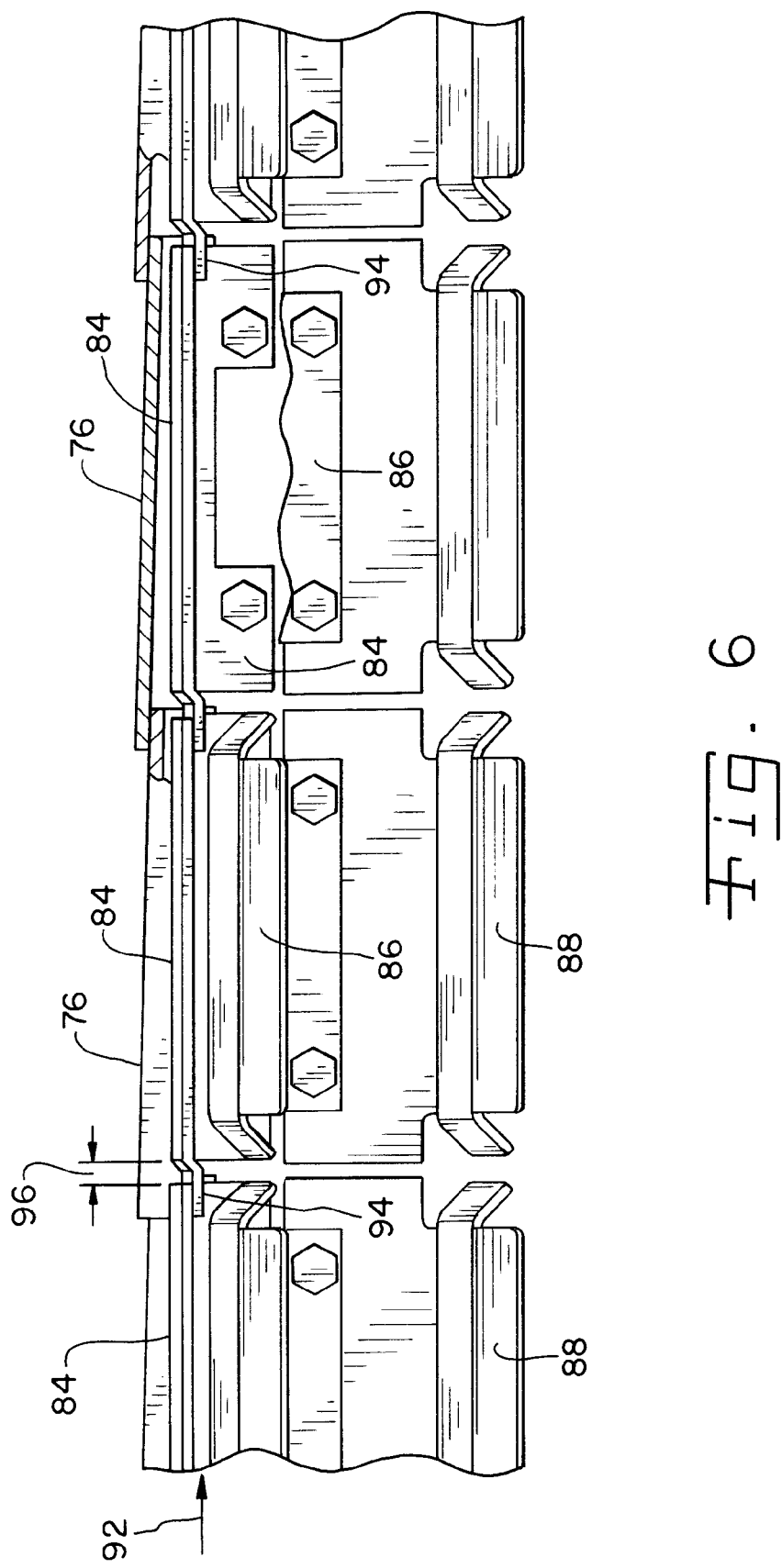
FIG. 6 is fragmentary, perspective view illustrating the belt guides, as viewed from the right of FIG. 5.

As best seen in FIGS. 5 and 6, endless belt 32 is guided by a plurality of belt guides 84, upper run carriers 86 and lower run carriers 88. Endless belt 32 has a plurality of spaced apart cleats 90 which do not extend to the lateral side edges thereof, allowing belt 32 to travel between belt guides 84 and upper run carriers 86 without unnecessary clearance space therebetween.

Each belt guide 84 is positioned adjacent to but is not connected with a corresponding crop ramp 76. The number and width of belt guides 84 substantially corresponds to the number and width of crop ramps 76. Each belt guide 84 has a generally L-shaped cross-sectional configuration with leading and trailing edges (relative to the direction of travel of endless belt 32) which are overlapped relative to each other. In FIG. 6, the direction of travel of the upper run of endless belt 32 between belt guides 84 and upper run carriers 86 is indicated by directional arrow 92. As will be observed, each belt guide 84 includes a tongue 94 which is underlapped with an adjacent belt guide 84. The direction of underlapping between adjacent belt guides 84 is generally opposite to the travel direction of endless belt 32. On the other hand, the crop material which is carried by endless belt 32 also slides along the upper surface of each belt guide 84. The underlap arrangement between adjacent belt guides 84 is in the same direction as the crop material movement across the upper surfaces thereof, resulting in less resistance and accumulation of the crop material as it slides along belt guides 84.

As described above with regard to crop ramp 76, belt guides 84 also may move relative to each other during flexure of cutting platform 12. To accommodate such movement, adjacent belt guides 84 are underlapped in a manner providing a clearance distance 96 therebetween. In the embodiment shown in FIG. 6, clearance distance 96 is between 4 to 25 millimeters, preferably approximately between 6 to 12 millimeters. This clearance distance has been found to be suitable to prevent impingement between adjacent belt guides 84 during maximum flexure in a downward direction.

Upper run carriers 86 and lower run carriers 88 each have down turned leading and trailing edges to prevent catching with endless belt 32. As may be observed in FIG. 6, each upper run carrier 86 and generally vertically aligned lower run carrier 88 are positioned in correspondence with and generally below a belt guide 84 and crop ramp 76. Endless belt 32 is for the most part in fact carried by the upper surfaces of upper run carriers 86 during operation. Conversely, endless belt 32 typically does not ride along the upper surfaces of lower run carriers 88, which assist in guiding endless belt 32 in the event of belt sagging, etc.

Configured as shown in FIG. 5, the leading edge of cutting platform 12 has a projected height of between approximately 3 to 4 inches. The projected height is primarily defined by the distance between skid shoe 96 and the upper extent of crop ramp 76.

During harvesting operation, float arms 28 are placed in a float state allowing free upward and downward movement as combine 10 traverses over the ground surface. Cutterbar assembly 22 moves up and down with float arms 28 on a localized basis, and crop ramps 76 and belt guides 84 move relative to each other to allow the flexibility at the leading edge of each platform section 16, 18 and 20. Belt guides 84 also cause each belt 32 to follow the cutterbar assembly by holding down on the upper surface of the belt as cutterbar assembly 22 locally dips downward. This prevents crop material from entering beneath belt 32. The present invention therefore provides a cutting platform which flexes to a high degree, efficiently moves crop material to the feeder housing, and maximizes harvest yield by better following the ground contour.

Figure 7:
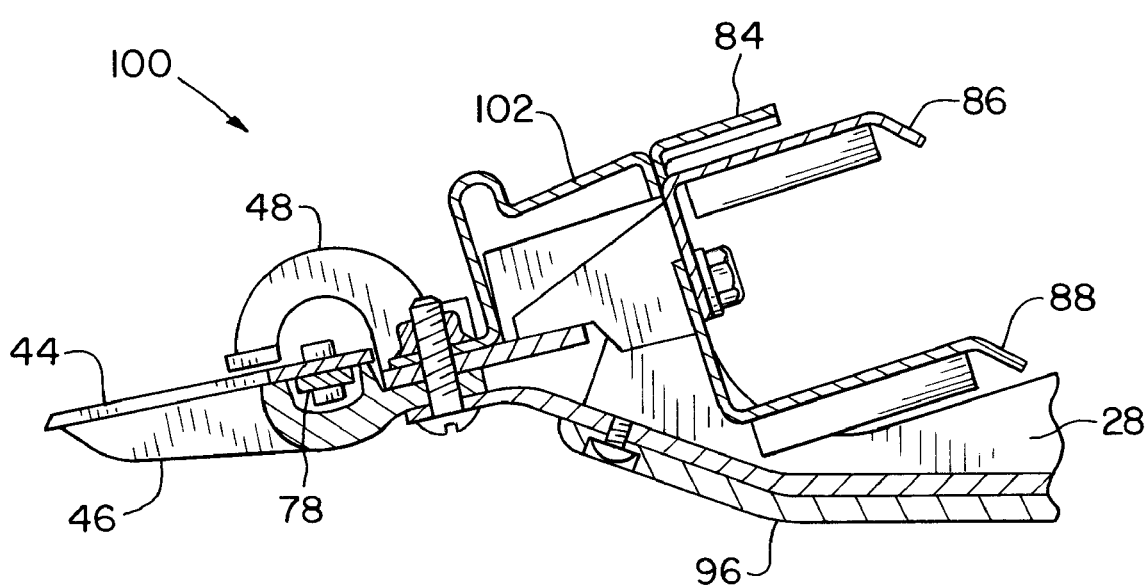
FIG. 7 is a fragmentary, side sectional view taken at the leading edge of another embodiment of a cutting platform of the present invention.
Figure 8:
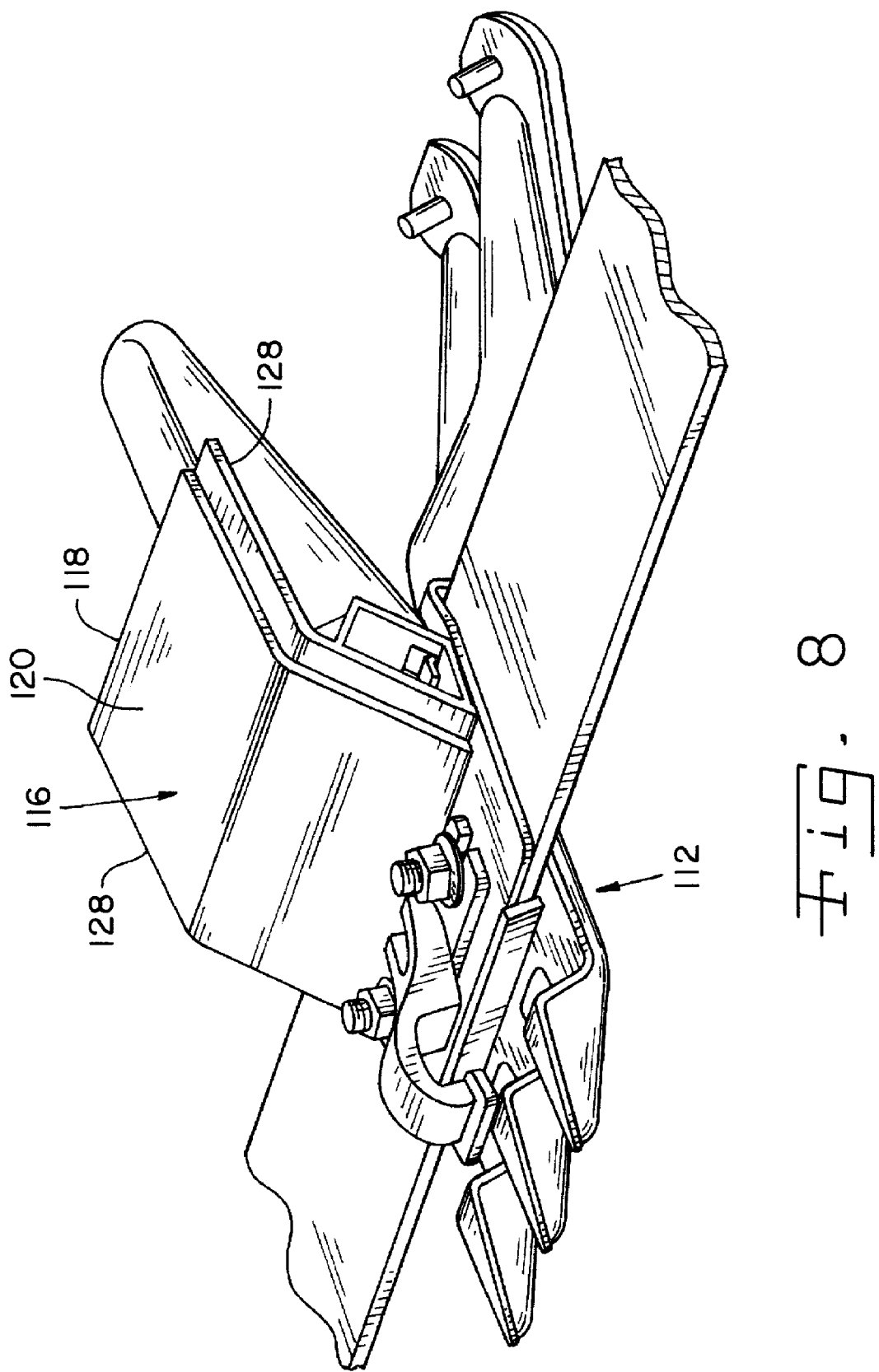
FIG. 8 is a fragmentary, front perspective view of the leading edge of another embodiment of a cutting platform of the present invention.

Referring now to FIG. 7, there is shown a fragmentary, sectional view through the leading edge of another embodiment of a cutting platform 100 of the present invention. The embodiment shown in FIG. 7 is in many respects similar to the embodiment shown in FIG. 5 and described above. The primary difference is that cutting platform 100 includes a plurality of adjacent and overlapped crop ramps 102 with a generally vertical front wall and the crop retaining ledge shifted closer to the cutterbar adjacent the front wall. This allows more room under the crop ramps for accommodating the various components which are interconnected together. Additionally, shifting the crop retaining ledge to the front wall which is closer to the cutterbar allows the crop material to be shifted onto the upper deck adjacent endless belt 32 sooner, and also provides a slightly larger carrying surface as the crop material is moved toward feeder housing 14.

Referring now to FIGS. 8-12, there is shown a portion of another embodiment of a cutting platform 110 of the present invention. Cutting platform 110 is similar in many respects to the embodiment of cutting platform 12 shown in FIGS. 1-6 and described above. To that end, cutting platform 110 may include a pair of wing platform sections and a center platform section, with each platform section carrying a cutterbar assembly 112 and a respective endless belt 114. Each platform section also carries a number of adjacent and overlapped belt guides 116 which can move relative to each other.

As described above with reference to FIGS. 1-6, belt guides 84 overlap from one belt guide to the next. The direction of overlap between adjacent belt guides 84 is generally opposite to the travel direction of endless belt 84. On the other hand, the overlap arrangement between adjacent belt guides 84 is in the same direction as the crop material movement across the upper surfaces thereof. This results in a smooth upper transition from one belt guide to the next so that crop material does not accumulate as it slides along the upper surfaces of adjacent belt guides 84.

However, with a belt guide 84 formed from metal as shown in FIGS. 1-6, the overlap is formed by bending the longitudinal end of the belt guide to form an underlap to provide the smooth upper transition between adjacent belt guides for the crop material. Machining the metal belt guide 84 so as not to have an underlap would likely be too expensive for the many belt guides that are utilized across the width of the cutting platform. This results in the underlap extending below the belt guide in a direction against the travel direction of the endless belt, which can possibly result in undue wear and early replacement of the endless belt.

In contrast, belt guides 116 are formed with both a smooth upper transition and a smooth lower transition between adjacent belt guides 116, resulting in no or little accumulation of crop material above the belt guides, and no extra wear to the endless belt below the belt guides.

More particularly, each belt guide 116 has a rear edge 118 with an upper surface 120 and a lower surface 122. Lower surface 122 partially overlies a leading edge 124 of endless belt 114. Upper surface 120 and lower surface 122 each have a continuous, uninterrupted contour. That is, there are no abrupt discontinuities such as recesses or projections which might tend to accumulate crop material (on top) or wear the endless belt (below). In the embodiment shown, upper surface 120 and lower surface 122 are each generally planar, but could also be formed with a slight curvature (e.g., simple or compound curvature).

Each belt guide 116 also has a pair of longitudinal ends 128. Each longitudinal end 128 has an overlap 130 which is configured for a smooth upper transition and/or a smooth lower transition with an adjacent belt guide 116 when installed on cutting platform 110. In the case of a smooth upper transition, there are no discontinuities in the area of the overlap 130 which extend above the upper surface 120. In the case of a smooth lower transition, there are no discontinuities in the area of the overlap 130 which extend below the lower surface 122.

By providing an overlap with both a smooth upper transition and smooth lower transition between adjacent belt guides 116, it is possible to form belt guides 116 from plastic in the illustrated embodiment. If belt guides 116 were formed from plastic and had an underlap, such as belt guides 84 described above, then the endless belt 114 would wear against the underlap and likely wear off the underlap between adjacent belt guides, which obviously would not be desirable.

In the embodiment shown, each end 128 has a complimentary overlap 130 with a lip 132 which is approximately one-half the thickness of end 128 (and also one-half the thickness of rear edge 118). By forming lip 132 with a thickness which is only a partial thickness of end 128, complimentary lips 132 may overlie each other and still only have a thickness corresponding to end 128. Each lip 132 need not be one-half the thickness of end 128, but could be a different proportional thickness which still totals the thickness of end 128. For example, one lip 132 could be approximately 60% of the thickness of end 128 and the other complimentary lip 132 could be approximately 40% of the thickness of end 128.

The direction of overlap between adjacent belt guides 116 is generally opposite to the travel direction of endless belt 114. However, by providing a smooth lower transition between adjacent belt guides 116, there is no undue wear to either the lip 132 or the endless belt 114. Further, the direction of overlap between adjacent belt guides 116 is in the same direction as the crop material movement across the upper surfaces thereof, resulting in little or no accumulation of crop material on top of belt guides 116.

Figure 9:
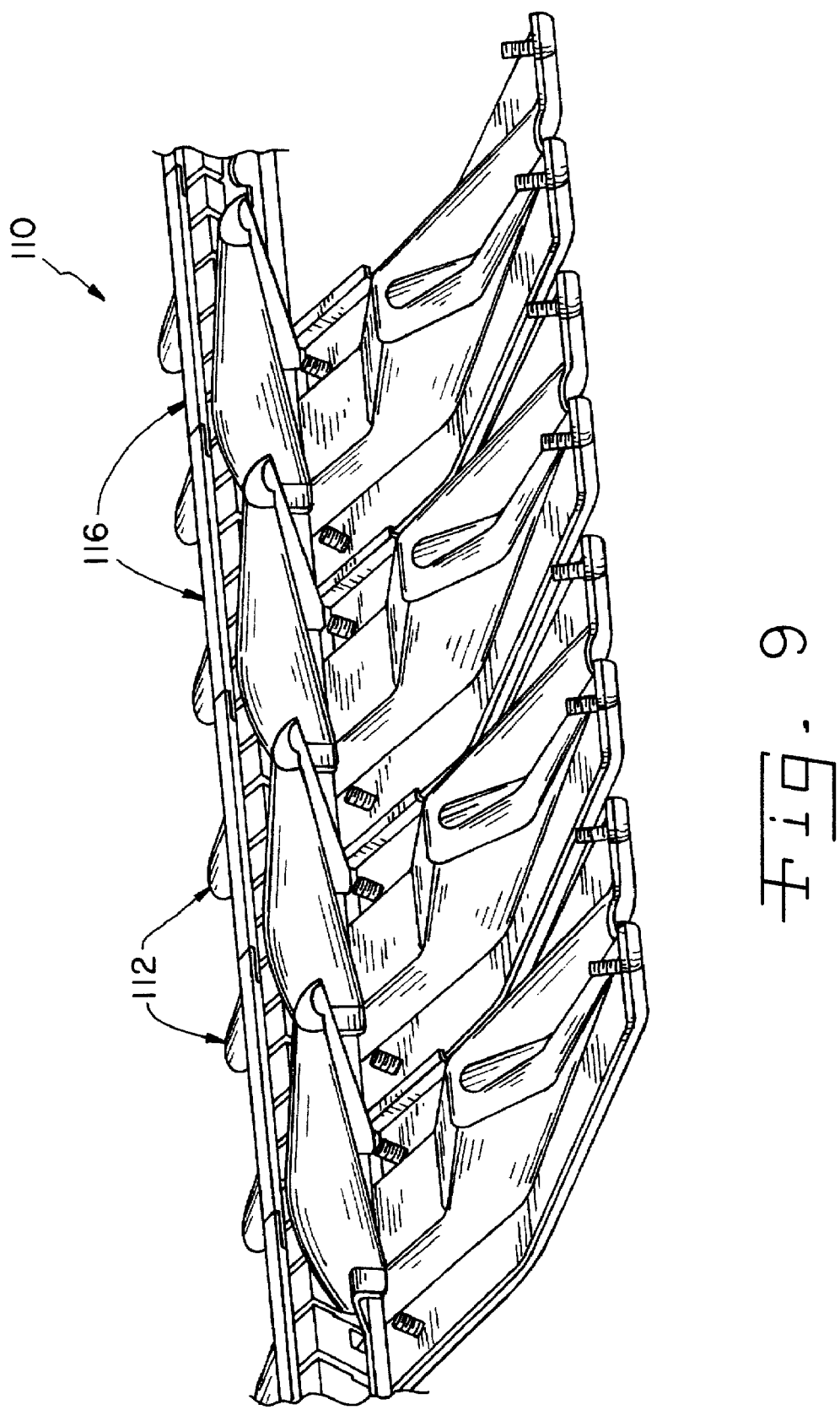
FIG. 9 is a fragmentary, rear perspective view of the leading edge shown in FIG. 8.
Figure 10:
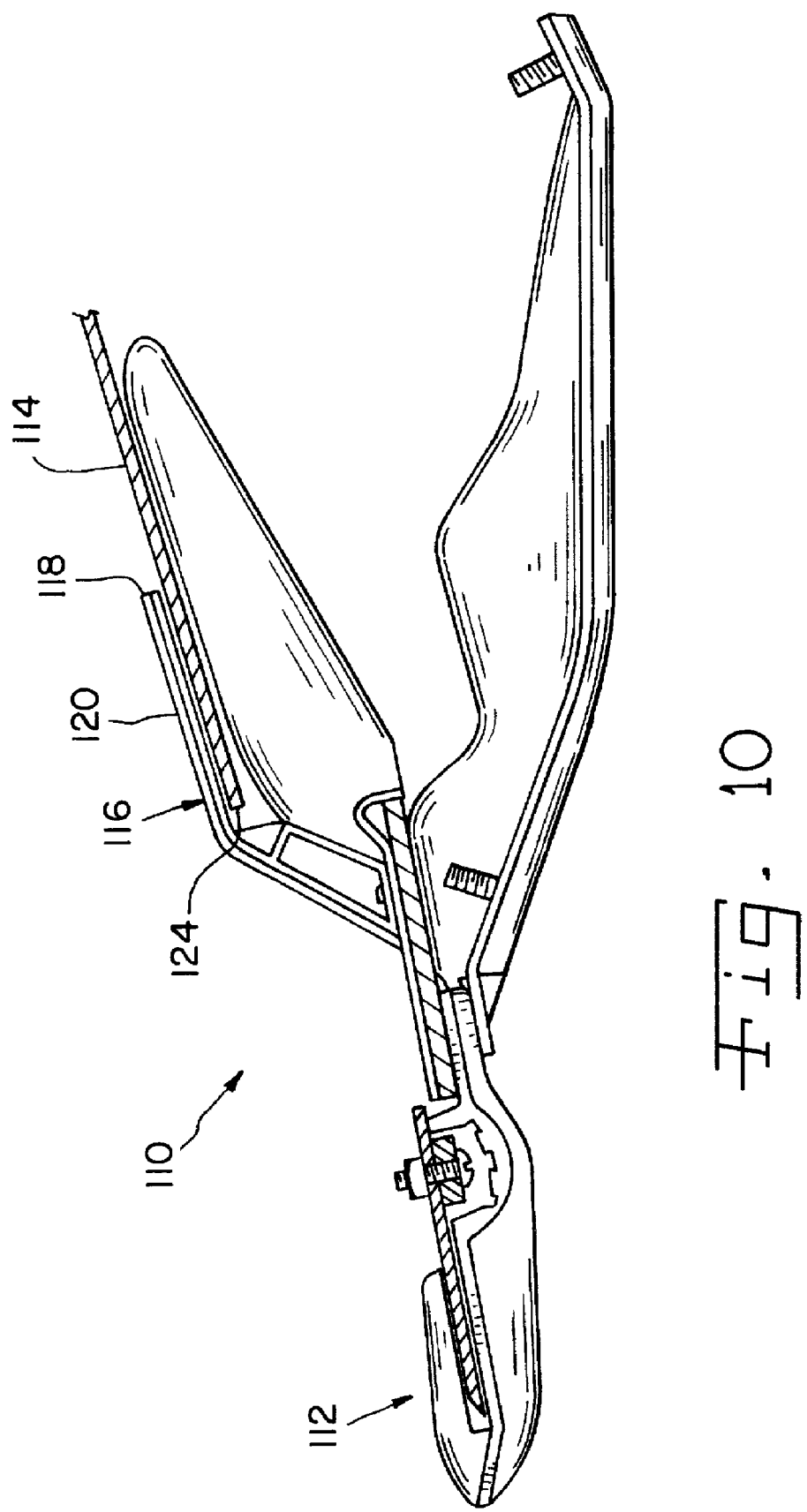
FIG. 10 is a fragmentary, side sectional view taken at the leading edge of FIGS. 8 and 9.
Figure 11:
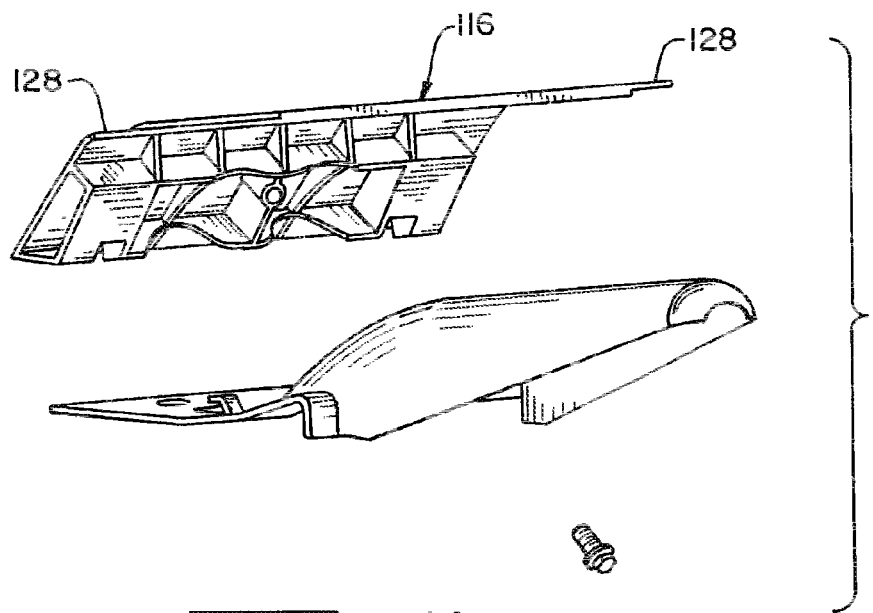
FIG. 11 is an exploded, rear perspective view of the belt guide and belt support shown in FIGS. 8-10.
Figure 12:
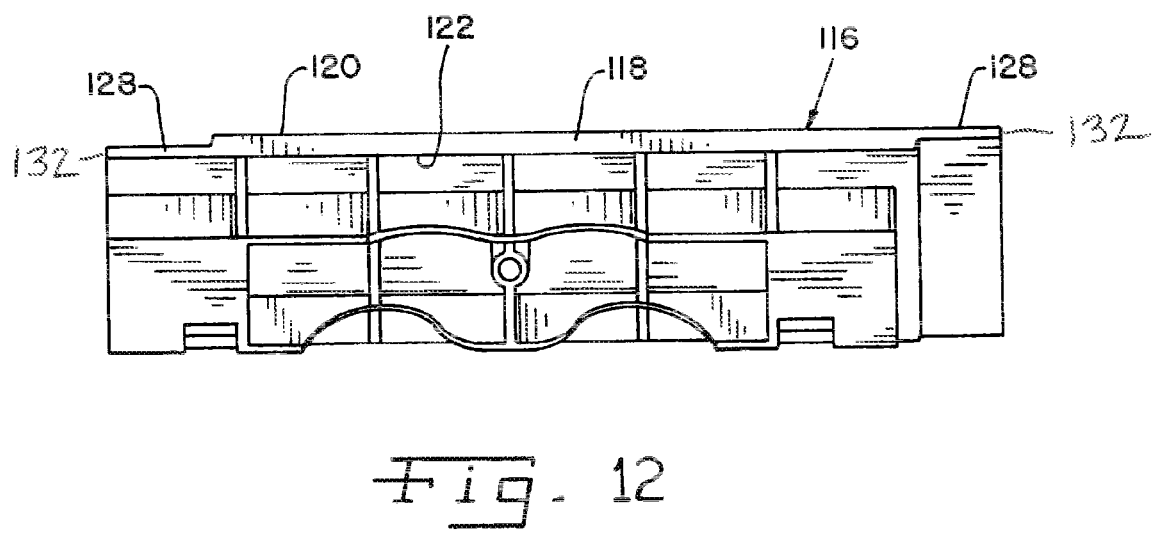
FIG. 12 is a rear view of the belt guide shown in FIG. 11.
Figure 13:
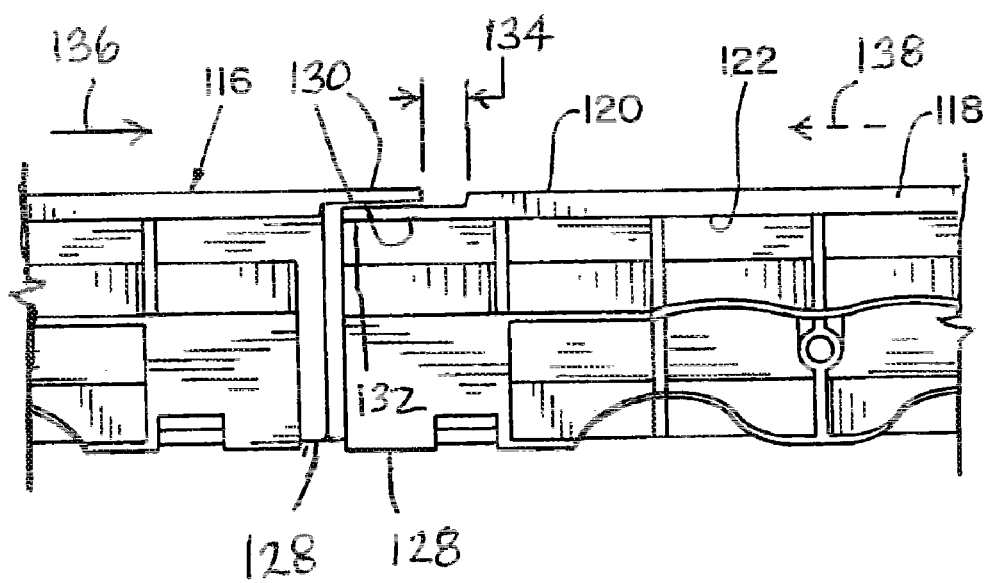
FIG. 13 is a partially fragmentary rear view of two adjacent, overlapped belt guides as shown in FIGS. 9 and 12.

It will be appreciated that there is a slight gap 134 in the area of the overlap between adjacent belt guides 116 to allow movement of the plurality of belt guides 116 relative to each other and thereby provide for localized movement of the cutterbar assembly 112 (FIGS. 9 and 13). In the embodiment shown, longitudinal ends 128 have a gap of between 0 to 1.5 mm. The direction of overlap 130 can either be in the same direction 136 of the crop material (as shown in FIG. 13), or in the direction opposite travel direction 138 (shown with dashed line).

Having described the preferred embodiment, it will become apparent that various modifications can be made without departing from the scope of the invention as defined in the accompanying claims.

The invention claimed is:

1. A cutting platform for use with an agricultural harvesting machine, comprising:
  a plurality of platform sections, at least one said platform section including:
    a cutterbar assembly movable in a localized manner in upwards and downwards directions;
    an endless belt having a leading edge; and
    a plurality of individual belt guides, each said belt guide having a rear edge with an upper surface and a lower surface, each said lower surface partially overlying said leading edge of said endless belt, adjacent said belt guides having an overlap with at least one of a smooth upper transition and a smooth lower transition at said overlap, said smooth upper transition having an absence of any discontinuities extending above adjacent said upper surfaces, said smooth lower transition having an absence of any discontinuities extending below adjacent said lower surfaces.

2. The cutting platform of claim 1, wherein said belt guides are movable relative to each other.

3. The cutting platform of claim 1, wherein adjacent said belt guides have a smooth upper transition.

4. The cutting platform of claim 1, wherein adjacent said belt guides have a smooth upper transition and a smooth lower transition.

5. The cutting platform of claim 4, wherein said upper surfaces and said lower surfaces have a continuous, uninterrupted contour.

6. The cutting platform of claim 5, wherein said upper surfaces and said lower surfaces are generally planar.

7. The cutting platform of claim 1, wherein said rear edge has a thickness, and adjacent said belt guides each have a complimentary overlap which is approximately one-half the thickness of said rear edge.

8. The cutting platform of claim 7, wherein each said overlap includes a lip which is approximately one-half the thickness of said rear edge.

9. The cutting platform of claim 8, wherein said plurality of belt guides are formed from plastic.

10. The cutting platform of claim 1, wherein said belt guides overlap with a gap of between 0 to 1.5 mm.

11. The cutting platform of claim 1, wherein said upper surfaces of adjacent said belt guides overlap in a direction corresponding to a travel direction of said endless belt.

12. The cutting platform of claim 1, wherein said upper surfaces of adjacent said belt guides overlap in a direction opposite to a travel direction of said endless belt.

13. A belt guide for use with a cutting platform in an agricultural harvesting machine, said belt guide comprising:
a rear edge and a longitudinal end, said rear edge having an upper surface and a lower surface, said lower surface configured to partially overlie a leading edge of an endless belt, said longitudinal end having an overlap configured for at least one of a smooth upper transition and a smooth lower transition with an adjacent one of a plurality of individual belt guides when installed on the cutting platform, said smooth upper transition having an absence of any discontinuities extending above said upper surface, said smooth lower transition having an absence of any discontinuities extending below said lower surface.

14. The belt guide of claim 13, wherein said upper surface and said lower surface have a continuous, uninterrupted contour.

15. The belt guide of claim 14, wherein said upper surface and said lower surface are generally planar.

16. The belt guide of claim 13, wherein said rear edge has a thickness, and said overlap is approximately one-half the thickness of said rear edge.

17. The belt guide of claim 16, wherein said overlap includes a lip which is approximately one-half the thickness of said rear edge.

18. The belt guide of claim 17, wherein said belt guide is formed from plastic.

19. An agricultural harvesting machine, comprising:
a base unit including a feeder housing; and
a cutting platform attached to said feeder housing, said cutting platform including a plurality of platform sections, at least one said platform section including:
a cutterbar assembly movable in a localized manner in upwards and downwards directions;
an endless belt having a leading edge; and
a plurality of individual belt guides, each said belt guide having a rear edge with an upper surface and a lower surface, each said lower surface partially overlying said leading edge of said endless belt, adjacent said belt guides having an overlap with at least one of a smooth upper transition and a smooth lower transition at said overlap, said smooth upper transition having an absence of any discontinuities extending above adjacent said upper surfaces, said smooth lower transition having an absence of any discontinuities extending below adjacent said lower surfaces.

20. The agricultural harvesting machine of claim 19, wherein adjacent said belt guides have a smooth upper transition.

21. The agricultural harvesting machine of claim 19, wherein adjacent said belt guides have a smooth upper transition and a smooth lower transition.

22. The agricultural harvesting machine of claim 21, wherein said upper surfaces and said lower surfaces are generally planar.

23. The agricultural harvesting machine of claim 19, wherein said rear edge has a thickness, and adjacent said belt guides each have a complimentary overlap with a lip which is approximately one-half the thickness of said rear edge.

24. An agricultural harvesting machine, comprising:
a base unit including a feeder housing; and
a cutting platform attached to said feeder housing, said cutting platform including a plurality of platform sections, at least one said platform section including:
a cutterbar assembly movable in a localized manner in upwards and downwards directions;
an endless belt having a leading edge; and
a plurality of belt guides, each said belt guide having a rear edge with an upper surface and a lower surface, each said lower surface partially overlying said leading edge of said endless belt, adjacent said belt guides having an overlap with at least one of a smooth upper transition and a smooth lower transition at said overlap, said smooth upper transition having an absence of any discontinuities extending above adjacent said upper surfaces, said smooth lower transition having an absence of any discontinuities extending below adjacent said lower surfaces, wherein said upper surfaces of adjacent said belt guides overlap in a direction corresponding to a travel direction of said endless belt.

25. An agricultural harvesting machine, comprising:
a base unit including a feeder housing; and
a cutting platform attached to said feeder housing, said cutting platform including a plurality of platform sections, at least one said platform section including:
a cutterbar assembly movable in a localized manner in upwards and downwards directions;
an endless belt having a leading edge; and
a plurality of belt guides, each said belt guide having a rear edge with an upper surface and a lower surface, each said lower surface partially overlying said leading edge of said endless belt, adjacent said belt guides having an overlap with at least one of a smooth upper transition and a smooth lower transition at said overlap, said smooth upper transition having an absence of any discontinuities extending above adjacent said upper surfaces, said smooth lower transition having an absence of any discontinuities extending below adjacent said lower surfaces, wherein said upper surfaces of adjacent said belt guides overlap in a direction opposite to a travel direction of said endless belt.

\* \* \* \* \*

UNITED STATES PATENT AND TRADEMARK OFFICE
Certificate

Patent No. 7,549,280 B2                                                                 Patented: June 23, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Benjamin M. Lovett, Colona, IL (US); Mark A. Melton, Erie, IL (US); and Bruce A. Coers, North Hillsdale, IL (US).

Signed and Sealed this Fifth Day of October 2010.

<div align="right">

THOMAS B. WILL
*Supervisory Patent Examiner*
Art Unit 3671
Technology Center 3600

</div>